United States Patent
Li et al.

(10) Patent No.: US 11,292,131 B2
(45) Date of Patent: Apr. 5, 2022

(54) LOCALIZATION METHOD AND APPARATUS, AND ROBOT AND COMPUTER READABLE STORAGE MEDIUM

(71) Applicant: CLOUDMINDS ROBOTICS CO., LTD., Shanghai (CN)

(72) Inventors: Lianzhong Li, Guangdong (CN); William Xiao-Qing Huang, Guangdong (CN); Shenhua Xu, Guangdong (CN); Jian Zhang, Guangdong (CN); Shenglin Qiu, Guangdong (CN)

(73) Assignee: Cloudminds Robotics Co., Ltd., Shanghai (CN)

( * ) Notice: Subject to any disclaimer, the term of this patent is extended or adjusted under 35 U.S.C. 154(b) by 187 days.

(21) Appl. No.: 16/687,838

(22) Filed: Nov. 19, 2019

(65) Prior Publication Data
US 2020/0078944 A1 Mar. 12, 2020

Related U.S. Application Data (63) Continuation of application No. PCT/CN2018/075170, filed on Feb. 2, 2018.

(51) Int. Cl.
| | | |
|---|---|---|
| *B25J 9/16* | (2006.01) | |
| *G05D 1/02* | (2020.01) | |
| *G01C 21/30* | (2006.01) | |

(52) U.S. Cl.
CPC ............ *B25J 9/1666* (2013.01); *B25J 9/163* (2013.01); *G05D 1/0214* (2013.01);
(Continued)

(58) Field of Classification Search
CPC .. G05D 1/0253; G05D 1/0274; G05D 1/0246; G05D 1/0231; G01C 21/30;
(Continued)

(56) References Cited

U.S. PATENT DOCUMENTS

| | | | |
|---|---|---|---|
| 9,081,651 B2 | 7/2015 | Filev et al. | |
| 2008/0300777 A1* | 12/2008 | Fehr | G01C 21/20 |
| | | | 701/532 |

(Continued)

FOREIGN PATENT DOCUMENTS

| | | |
|---|---|---|
| CN | 100380259 C | 4/2008 |
| CN | 104102226 A | 10/2014 |

(Continued)

OTHER PUBLICATIONS

Search Report for Chinese Patent Application No. 201880001300.8 dated May 25, 2020.

(Continued)

*Primary Examiner* — Robert T Nguyen
*Assistant Examiner* — Dylan M Katz
(74) *Attorney, Agent, or Firm* — Heslin Rothenberg Farley & Mesiti PC (57) ABSTRACT

This application relates to the field of visual navigation technology, and discloses a localization method, apparatus, robot and computer storage medium. The localization method is applied to a robot having an autonomous location and navigation function. The localization method includes: determining that localization through an image of surrounding environment fails in a process of driving to a preset distance, and controlling the robot to decelerate and perform localization through an image of surrounding environment in a process of deceleration until the localization succeeds. The localization method enables the robot to reasonably adjust its running velocity in accordance with the environment during driving, thereby accurately localizing the location where the robot is located.

16 Claims, 5 Drawing Sheets

(52) U.S. Cl.
CPC ......... *G05D 1/0223* (2013.01); *G05D 1/0246* (2013.01); *G01C 21/30* (2013.01)

(58) Field of Classification Search
CPC .. G01C 21/005; G01C 21/10; B60K 31/0058; G06K 9/6202; G06T 7/70; G06T 7/143; G06T 7/162; G06T 7/74
See application file for complete search history.

(56) References Cited

U.S. PATENT DOCUMENTS

| | | | | |
|---|---|---|---|---|
| 2013/0261870 | A1* | 10/2013 | Halder | G05D 1/0278 |
| | | | | 701/25 |
| 2015/0165626 | A1* | 6/2015 | Desai | G05B 19/416 |
| | | | | 700/257 |
| 2017/0123429 | A1* | 5/2017 | Levinson | G01C 21/34 |
| 2018/0113469 | A1* | 4/2018 | Madison | G01C 21/165 |
| 2018/0315007 | A1* | 11/2018 | Kingsford | G06K 9/209 |

FOREIGN PATENT DOCUMENTS

| | | | |
|---|---|---|---|
| CN | 106200645 | A | 12/2016 |
| CN | 106573377 | A | 4/2017 |
| CN | 107065784 | A | 8/2017 |
| CN | 1077223244 | A | 9/2017 |
| CN | 107246876 | A | 10/2017 |
| CN | 107357286 | A | 11/2017 |
| CN | 107368071 | A | 11/2017 |
| JP | H02204807 | H | 8/1990 |
| JP | 2969174 | B1 | 11/1999 |
| JP | 2000284830 | A | 10/2000 |
| JP | 2002204807 | A | 7/2002 |
| JP | 2003162327 | A | 6/2003 |
| JP | 2012053839 | A | 3/2012 |
| JP | 2012221291 | A | 11/2012 |
| WO | 2009144805 | A1 | 12/2009 |

OTHER PUBLICATIONS

Examination Report for Japanese Patent Application No. 2019-561296 dated Nov. 13, 2020.
International Search Report (and English translation) and Written Opinion of the International Searching Authority for International Application No. PCT/CN2018/075170 dated Oct. 26, 2018.
Chinese Search Report for Chinese Patent Application No. 201880001300.8 dated Jul. 2, 2019.
Cloudminds (Shenzhen) Robotics Systems Co., Ltd., Decision of Refusal with English Translation for Japanese Patent Application No. 2019-561296, dated Nov. 9, 2021, 7 pgs.

* cited by examiner

LOCALIZATION METHOD AND APPARATUS, AND ROBOT AND COMPUTER READABLE STORAGE MEDIUM

CROSS-REFERENCE TO RELATED APPLICATIONS

The present application is a continuation of international application No. PCT/CN2018/075170, filed on Feb. 2, 2018, which is incorporated herein by reference in its entirety.

TECHNICAL FIELD

This application relates to the field of visual navigation technology, and particularly to a localization method and apparatus, a robot and a computer storage medium.

BACKGROUND

With the rapid development of science and technology such as the sensor technology and the artificial intelligence algorithms, the autonomous localization and navigation technology for robots based on visual simultaneous localization and mapping (VSLAM) has gained certain development, thus further enriching functions of the robots and constantly expanding the scope of application of robots. For example, in the logistics industry, automatic delivery robots are gradually replacing people to complete some or all the work, so that more and more people are getting more personal leisure time to enjoy life.

However, the inventor finds that at least the following problems exist in the existing technology: since robots with the autonomous localization and navigation function do not only move on even surfaces like indoors, but also move in an environment with complicated ground conditions like outdoors, for example, on cobblestone pavements. When moving on an uneven surface, the robot will continuously bump, causing an image collecting device (e.g., a camera) for capturing images of surrounding environment to be in an exposure state for a long time, resulting in that no clear image can be captured. Because an image of the surrounding environment is not clear, it can not match a pre-generated map to localize a current position of the robot. In this way, the robot can not plan a navigation route timely or accurately to complete a task, and seriously affects a user's experience.

SUMMARY

A technical problem that some embodiments of the present disclosure solve is to provide a localization method, a localization apparatus, a robot and a computer readable storage medium to solve the above-described technical problems.

One embodiment of the present disclosure provides a localization method applied to a robot with an autonomous localization and navigation function. The localization method includes determining that localization through an image of surrounding environment fails in a process of driving to a preset distance, and controlling the robot to decelerate and perform localization through an image of surrounding environment in a process of deceleration until the localization succeeds.

One embodiment of the present disclosure provides a localization apparatus applied to a robot with an autonomous localization and navigation function. The localization apparatus includes a localization module and a control module. The localization module is configured to perform localization through an image of surrounding environment in a process of driving to a preset distance. The control module is configured to control the robot to decelerate after the localization module determines that the localization through the image of surrounding environment fails, and control the localization module to perform localization through an image of surrounding environment in a process of deceleration until the localization succeeds.

One embodiment of the present disclosure provides a robot including at least one processor and a memory in communication connection with the at least one processor. The memory stores an instruction executable by the at least one processor. The instruction is executed by the at least one processor, to cause the at least one processor to execute the localization method involved in any method embodiment in the present disclosure.

One embodiment of the present disclosure provides a computer readable storage medium storing a computer instruction to cause the computer to execute the localization method involved in any method embodiment in the present disclosure.

Compared with the existing technology, in embodiments of the present disclosure, the robot with the autonomous localization and navigation function performs localization by acquiring an image of surrounding environment in the process of reaching a preset distance, the robot is controlled to decelerate when the localization through the image of surrounding environment fails, and performs localization through an image of surrounding environment in a process of deceleration until the localization succeeds. In accordance with the above-described localization method, the robot may reasonably adjust its running velocity in accordance with the surrounding environment during driving, thereby accurately localizing the location where the robot is located, and thereby timely and accurately planning for a navigation route to complete a task.

BRIEF DESCRIPTION OF THE DRAWINGS

One or more embodiments are described through the accompanying drawings equivalent to the one or more embodiments. The exemplary description does not constitute a limitation to embodiments of the present disclosure. Elements with the same reference numerals in the figures denote like elements, and the accompanying drawings are not to be construed as proportionally limiting unless specified otherwise.

DETAILED DESCRIPTION

In order to clarity the objectives, the technical solutions and the advantages of the present disclosure, some embodiments of the present disclosure will be further described in detail below with reference to the accompanying drawings and embodiments. It shall be appreciated that the embodiments described herein are merely illustrative of the present disclosure and are not intended to be limiting.

Figure 1:
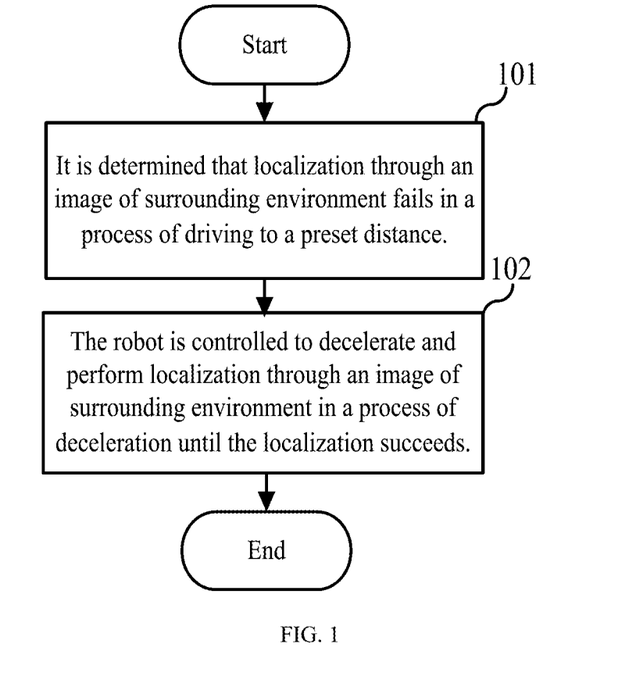
FIG. 1 is a flow chart of a localization method in a first embodiment of the present disclosure.

A first embodiment of the present disclosure relates to a localization method which can be applied to a robot with an autonomous localization and navigation function. A specific process of the localization method is shown in FIG. 1.

In step 101, it is determined that localization through an image of surrounding environment fails in a process of driving to a preset distance.

Particularly, in a process that the robot drives to a preset distance, an operation of performing localization through an image of surrounding environment may be implemented in the following manner.

To start with, the robot needs to collect and acquire images of surrounding environment at a preset cycle (e.g., every 5 seconds).

Thereafter, a processing unit (e.g., CPU) in the robot compares an acquired image of surrounding environment with an image in a pre-generated map sample set, and it is determined that the localization fails if the image of surrounding environment does not match any image in the map sample set. It is determined that the localization succeeds if the image of surrounding environment matches any image in the map sample set.

Further, the image in the pre-generated map sample set described in this embodiment may specifically be acquired through a data mining tool such as a web crawler. Besides, in order to ensure accuracy of the localization, images in the pre-generated map sample set may be updated at predetermined time intervals. It will not be described herein how the update is realized. Skilled persons in the art may perform reasonable arrangement based on practical requirements, which is not limited herein.

Further, in this embodiment, the image of surrounding environment for matching an image in the pre-generated map sample set is, specifically, acquired by using an image collecting apparatus (e.g., a camera) at a preset cycle.

Further, it shall be noted that in this embodiment, a position set for the image collecting device for collecting an image of surrounding environment is not limited. That is, the image collecting apparatus may be disposed on a robot (for a robot working directly on a road surface), or may be disposed on another object (for a robot working on a moving object). A specific implementation manner may be reasonably set by skilled persons in the art according to a practical requirement, which is not limited herein.

Further, the preset distance that the robot drives to as stated in this embodiment is, specifically, set based on the autonomous localization and navigation technology of the visual simultaneous localization and mapping (VSLAM). For example, for a certain robot, the preset distance may be 10 meters. That is, a location of the robot may be localized as long as an image of surrounding environment accurately matching an image in the map sample set is acquired within 10 meters. Afterwards, a navigation route may be drawn in accordance with a specific location localized within every preset distance, thereby autonomous navigation can be realized.

It shall be noted that the above-described embodiment is only an example and does not limit the technical solutions and the scope to be protected of the present disclosure. In practical applications, a manner of acquiring an image of surrounding environment and an implementation manner of comparing an acquired image of the environment with an image in the map sample set may be set as needed by skilled persons in the art, which is not limited herein.

In step 102, the robot is controlled to decelerate and perform localization through an image of surrounding environment in a process of deceleration until the localization succeeds.

Particularly, step 102 may be implemented in the following manner.

The robot is controlled to decelerate from a first running velocity (a normal running velocity set for the robot, i.e., a running velocity when the localization succeeds for the first time) to a second running velocity. An image of surrounding environment is re-acquired by the image collecting apparatus after the robot decelerates to the second running velocity and then the robot performs localization.

The deceleration is stopped if it is determined that the localization succeeds (i.e., the required image of surrounding environment matches any image in the map sample set), and the robot continues to drive with the second running velocity as a running velocity that is needed for its task.

The robot is controlled to further decelerate, e.g., the robot decelerates from the second running velocity to a third running velocity, if it is determined that the localization fails (the required image of surrounding environment does not match any image in the map sample set). After the robot decelerates to the third running velocity, the image collecting apparatus is reused to acquire an image of surrounding environment to perform localization until the localization succeeds. Otherwise, the robot continues to decelerate.

It shall be noted that in this embodiment, the above-described operation of controlling the robot to decelerate is realized in accordance with a velocity curve.

Herein, the velocity curve is, specifically, used to denote a correspondence between the running velocity and time.

Further, the velocity curve may be any one of or any combination of the followings: a cosine velocity curve, a sinusoidal velocity curve, a trapezoidal velocity curve and an S-shaped velocity curve.

Further, in practical applications, a velocity of a robot cannot decelerate to a negative value (i.e., less than 0) during deceleration of the robot. Therefore, in order to enable a process of controlling the robot to decelerate in accordance with a velocity curve to better comply with a practical condition, an angle denoted by a cosine value in the cosine velocity curve provided in this embodiment has a value range of $[0, \pi]$, and an angle denoted by a sinusoidal value in the sinusoidal velocity curve has a value range of $[\pi, 2\pi]$.

Figure 2:
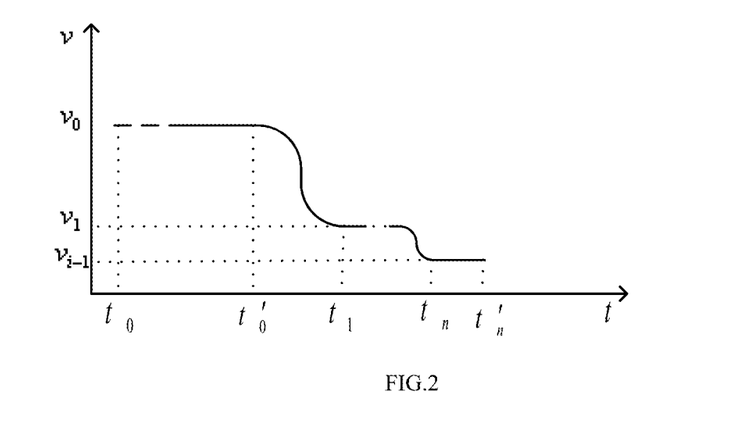
FIG. 2 is a diagram of adjusting a running velocity of a robot in accordance with a cosine or sinusoidal velocity curve in the first embodiment of the present disclosure.
Figure 3:
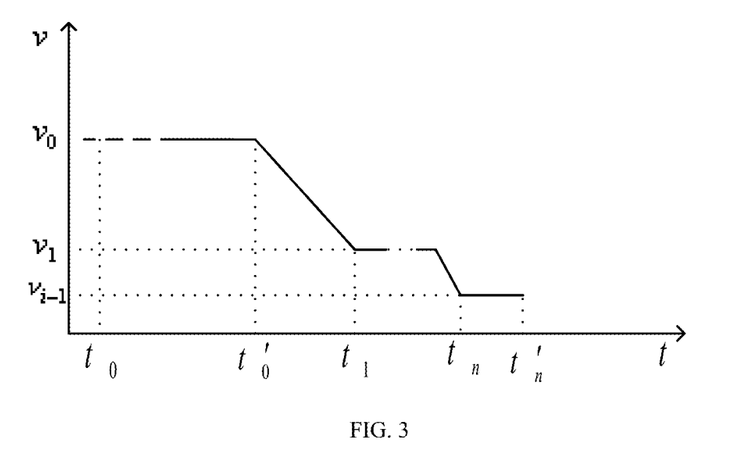
FIG. 3 is a diagram of adjusting the running velocity of the robot in accordance with a trapezoidal velocity curve in the first embodiment of the present disclosure.
Figure 4:
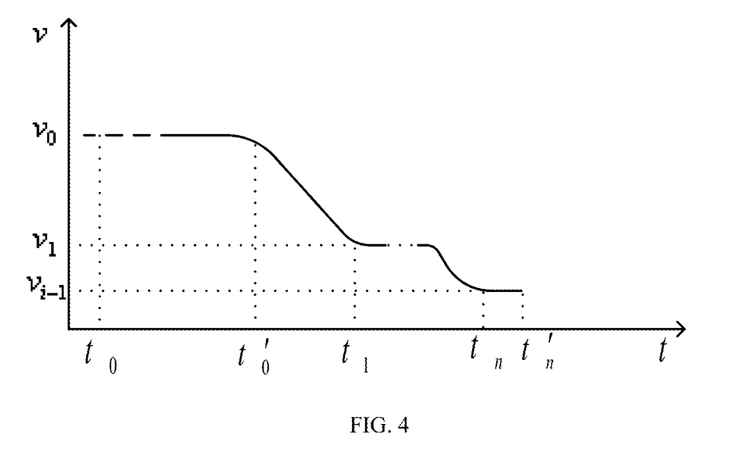
FIG. 4 is a diagram of adjusting the running velocity of the robot in accordance with an S-shaped velocity curve in the first embodiment of the present disclosure.

In order to facilitate understanding manners of controlling the robot to decelerate in accordance with the above-described four types of velocity curves, a particular description is performed with reference to FIGS. 2 to 4.

It shall be noted that the cosine velocity curve is drawn based on a cosine function, the sinusoidal velocity curve is drawn based on a sinusoidal function, a sinusoidal function and a cosine function may substitute each other, and the cosine velocity curve drawn when the angle denoted by the cosine value has the value range of [0, π] is the same as the sinusoidal velocity curve drawn when the angle denoted by the sinusoidal value has the value range of [π, 2π]. Therefore, a curve acquired by controlling the robot to decelerate based on the cosine velocity curve and the sinusoidal velocity curve is shown in FIG. 2. In order to facilitate the description, the cosine velocity curve is taken as an example for description with reference to FIG. 2.

Particularly, controlling the robot to decelerate based on the cosine velocity curve is implemented in accordance with the following formula:

$$v = \begin{cases} v_0 & t_0 < t \le t_0' \\ (v_0 \cdot \cos(T) + 3v_0)/4 & t_0' < t \le t_1 \\ v_0/2 & t_1 < t \le t_1' \\ (v_0 \cdot \cos(T) + v_0)/4 & t_1' < t \le t_2 \end{cases}$$

Herein, $v_o$ is a velocity when the robot runs at a uniform velocity, T is a cosine angle within the value range of [0, π], 0 and π are included in the value range.

FIG. 2 may be acquired in accordance with the above-described formula. Particularly, FIG. 2 shows the following: from a certain time point $t_0$ when the localization succeeds, the robot patrols at a velocity of $v_o$ (i.e., a first velocity as stated in this embodiment) and continues to perform localization. If the localization is unsuccessful after the robot runs to a preset distance D, the robot decelerates in accordance with the cosine velocity curve to $v_1$ (i.e., $v_o/2$) between time points $t_0'$ and $t_1$. Afterwards, the robot runs at a uniform velocity during which the localization continues. If the robot performs the localization successfully at the velocity of $v_1$, the localization is completed. If the localization fails, the robot continues to decelerate and performs the localization until the localization succeeds.

FIG. 3 is a diagram of adjusting the running velocity of the robot in accordance with the trapezoidal velocity curve. It is seen from FIG. 3 that a manner of adjusting the running velocity of the robot in accordance with the trapezoidal velocity curve is, specifically, to adjust the running velocity in an order of a uniform running velocity, uniform deceleration and a uniform running velocity, until it is successful to localize a location where the robot currently is in accordance with a re-acquired image of surrounding environment.

FIG. 4 is a diagram of adjusting the running velocity of the robot in accordance with an S-shaped velocity curve. It is seen from FIG. 4 that adjusting the running velocity of the robot in accordance with the S-shaped velocity curve is, specifically, to adjust the running velocity in an order of a uniform running velocity, decreasing deceleration, uniform deceleration, increasing deceleration and a uniform running velocity, until it is successful to localize a location where the robot currently is in accordance with a re-acquired image of surrounding environment.

It shall be noted that the above-mentioned decreasing deceleration refers to a deceleration by a decreasing accelerated velocity (so as to control an accelerated velocity of decreasing running velocity), that is, the accelerated velocity in the process is not a fixed value, but is continuously decreasing.

The above-described increasing deceleration refers to a deceleration performed by a continuously increasing accelerated velocity, i.e., a process of slight acceleration from uniform deceleration to uniform running velocity.

Further, it shall be noted that the above-described embodiment is only an example and does not limit the technical solutions and the scope to be protected of the present disclosure. In practical applications, an operation of controlling the robot to decelerate in accordance with the above-described types of velocity curves may be set reasonably by skilled persons in the art through technical means mastered by the skilled persons in the art.

Further, that the robot is controlled to decelerate in accordance with the above-described various velocity curves and that an accelerated velocity value required during a process of recovering a running speed may be reasonably set and are not limited herein.

Further, concerning a running velocity each deceleration decreases to, skilled persons in the art may pre-store a running velocity adjustment table in the robot in accordance with a type of the robot and a scenario where the robot is applied, so as to facilitate the robot's deceleration in accordance with the pre-stored running velocity adjustment table every time the robot needs to decelerate. As to a particular way of implementation, it is not limited herein.

Compared with the existing technology, the localization manner provided in this embodiment enables the robot to reasonably adjust its running velocity in accordance with the surrounding environment during driving, thereby accurately localizing the location where the robot is located, and thereby timely and accurately planning for a navigation route to complete a task.

Figure 5:
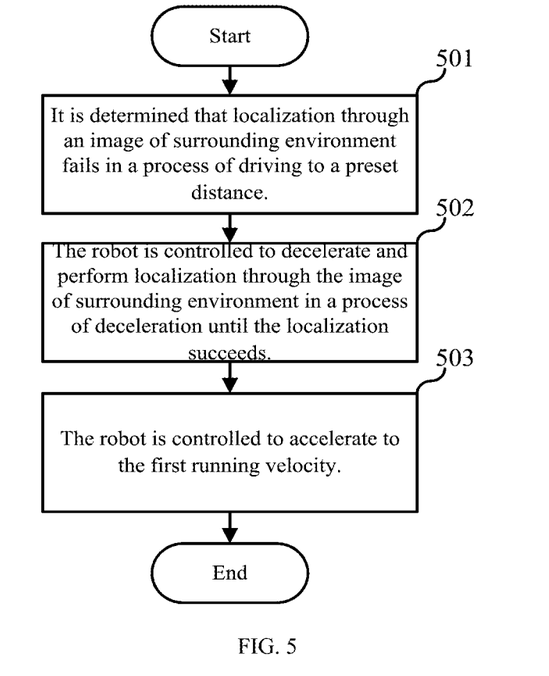
FIG. 5 is a flow chart of a localization method in a second embodiment of the present disclosure.

A second embodiment of the present disclosure relates to a localization method. This embodiment further develops the first embodiment in controlling the robot to accelerate to the first running velocity after determining that the localization succeeds, as shown in FIG. 5.

Particularly, this embodiment includes steps 501 to 503. Herein steps 501 and 502 are respectively generally the same as steps 101 and 102 in the first embodiment and are not repeated herein for purpose of clarity, but the differences therebetween are explained in the following. Technical details are not described in this embodiment, but the localization method provided in the first embodiment may be referred to and are not repeated herein.

In step 503, the robot is controlled to accelerate to the first running velocity.

Particularly, after it is determined that the localization succeeds, the robot is controlled to accelerate to the first running velocity according to the following manner.

For example, after it is determined that the localization succeeds, the robot acquires a current running velocity through a velocity detection apparatus of the robot itself. As long as the acquired current running velocity is greater than or equal to 0, an accelerated velocity value is calculated in accordance with the first running velocity, the current running velocity and a time set for recovering to the first running velocity. Thereafter, the robot is controlled to accelerate to the first running velocity in accordance with the accelerated velocity value acquired through calculation.

Further, a value range of a reasonable running velocity for the robot to work normally may be set in accordance with practical conditions. If an acquired current running velocity is still within the value range of the reasonable running velocity for the robot to work normally, the robot may recover to the first running velocity or continue to run at the current running velocity.

If the acquired current running velocity is not within the value range of the reasonable running velocity for the robot to work normally, the robot is controlled to accelerate to the first running velocity.

It shall be noted that the above-described embodiment is only an example, but does not limit the technical solutions and protection scope. In practical applications, skilled persons in the art may set the robot reasonably in accordance with practical needs, which is not limited herein.

Figure 6:
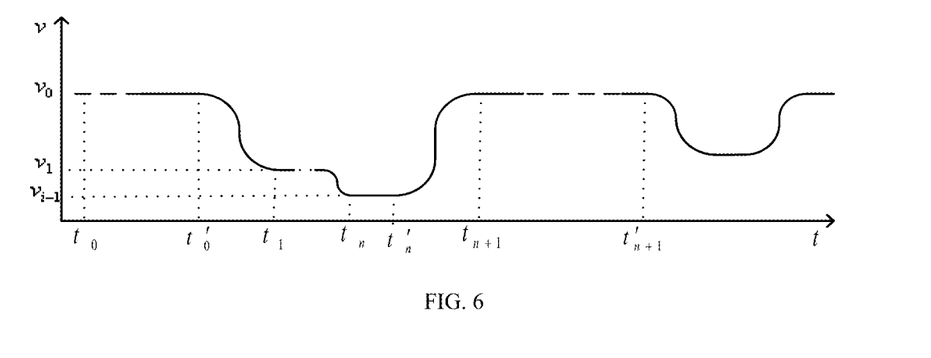
FIG. 6 is a diagram of adjusting a running velocity of a robot in accordance with a cosine or sinusoidal velocity curve in the second embodiment of the present disclosure.
Figure 7:
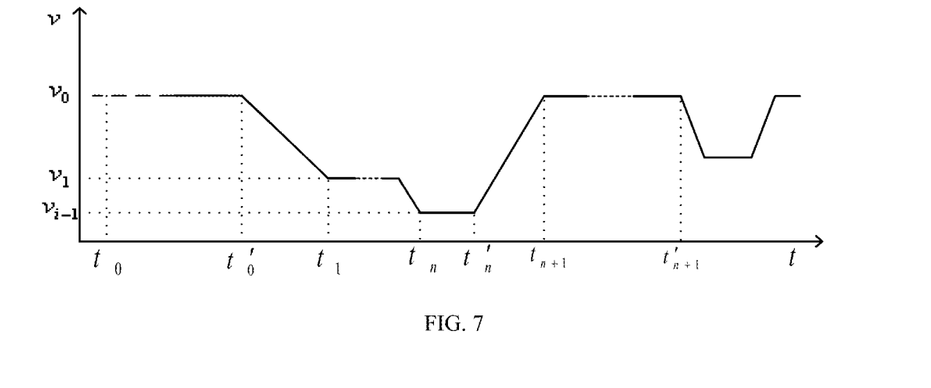
FIG. 7 is a diagram of adjusting the running velocity of the robot in accordance with a trapezoidal velocity curve in the second embodiment of the present disclosure.
Figure 8:
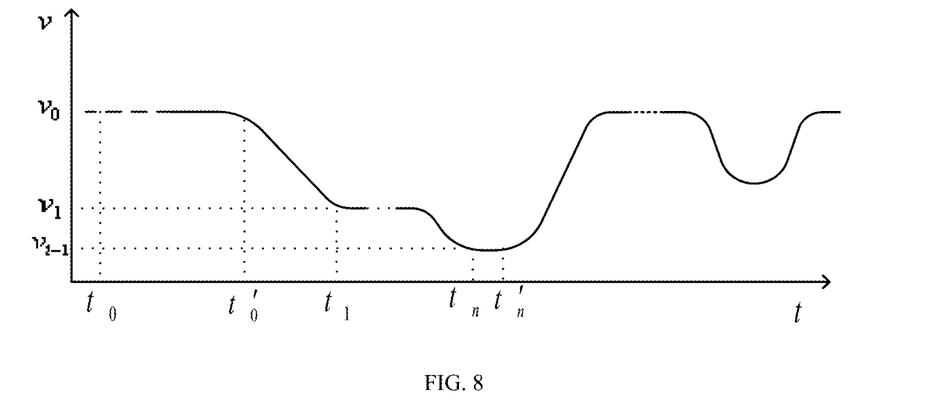
FIG. 8 is a diagram of adjusting the running velocity of the robot in accordance with an S-shaped velocity curve in the second embodiment of the present disclosure.

In order to facilitate understanding the implementation method of controlling the robot to decelerate in accordance with such four velocity curves as the cosine velocity curve, the sinusoidal velocity curve, the trapezoidal velocity curve and the S-shaped velocity curve, description is provided with reference to FIGS. 6 to 8.

It shall be noted that the cosine velocity curve is drawn based on a cosine function, the sinusoidal velocity curve is drawn based on a sinusoidal function, wherein a sinusoidal function and a cosine function may substitute each other, and the cosine velocity curve drawn when the angle denoted by the cosine value has the value range of [0, π] is the same as the sinusoidal velocity curve drawn when the angle denoted by the sinusoidal value has the value range of [π, 2π]. Therefore, a curve acquired by controlling the robot to decelerate based on the cosine velocity curve and the sinusoidal velocity curve is shown in FIG. 6. In order to facilitate explaining the cosine velocity curve is taken as an example for description with reference to FIG. 6.

Particularly, controlling the robot to decelerate in accordance with the cosine velocity curve is implemented in accordance with the following formula:

$$v = \begin{cases} v_0 & t_0 < t \le t_0' \\ (v_0 \cdot \cos(T) + 3v_0)/4 & t_0' < t \le t_1 \\ v_0/2 & t_1 < t \le t_1' \\ (v_0 \cdot \cos(T) + v_0)/4 & t_1' < t \le t_2 \\ 0 & t_2 < t \le t_2' \\ (v_0 \cdot \cos(T + \pi) + v_0)/2 & t_2' < t \le t_3 \\ v_0 & t_3 < t \le t_3' \end{cases}$$

Herein, $v_o$ is a velocity when the robot runs at a uniform velocity, T is a cosine angle within the value range of [0, π], and 0 and π are included in the value range.

FIG. 6 may be acquired in accordance with the above-described formula.

Particularly, FIG. 6 shows the followings: from a certain time point $t_0$ when the localization succeeds, the robot patrols at a velocity of $v_o$ (i.e., the first running velocity as stated in this embodiment) and continues to perform localization. If the localization fails after the robot runs to a preset distance D, the robot decelerates in accordance with the cosine velocity curve to $v_1$ (i.e., $v_o/2$) between time points $t_0'$ and $t_1$. Afterwards, the robot runs at a uniform velocity during which the localization continues. If the robot performs the localization successfully at the velocity of $v_1$, the robot accelerates to $v_o$ in accordance with the cosine velocity curve. If the localization fails, the robot continues to decelerate and performs the localization until the localization succeeds and afterwards the robot accelerates to $v_o$ in accordance with the cosine velocity curve.

It shall be noted that the above-described formula presents an extreme condition, that is, in the process of deceleration and localization, the localization does not succeed until the running velocity decreases to 0. In this condition, in order to prevent the robot from suddenly accelerating to $v_o$ resulting in falling of the robot due to imbalance, the robot may be controlled to accelerate from 0 to $v_1$, and then to accelerate from $v_1$ to $v_0$.

In practical applications, skilled persons in the art may preset the robot, but the present disclosure is not limited to a particular implementation manner.

FIG. 7 is a diagram of adjusting the running velocity of the robot in accordance with the trapezoidal velocity curve. It is seen from FIG. 7 that adjusting the running velocity of the robot in accordance with the trapezoidal velocity curve is, specifically, to adjust the running velocity in an order of a uniform running velocity, uniform deceleration and a uniform running velocity, until it successfully localizes a location where the robot currently is in accordance with a re-acquired image of surrounding environment. After the localization succeeds, in the process of controlling the robot to accelerate to $v_0$, the current running velocity of the robot is adjusted in a manner of uniform acceleration until the robot recovers to the initial running velocity $v_0$.

FIG. 8 is a diagram of adjusting the running velocity of the robot in accordance with the S-shaped velocity curve. It is seen from FIG. 8 that adjusting the running velocity of the robot in accordance with the S-shaped velocity curve is, specifically, to adjust the running velocity in an order of a uniform running velocity, decreasing deceleration, uniform deceleration, increasing deceleration and a uniform running velocity, until it successfully localizes a location where the robot currently is in accordance with a re-acquired image of surrounding environment. After the localization succeeds, in the process of controlling the robot to accelerate to $v_0$, the current running velocity of the robot is adjusted in an order of decreasing acceleration, uniform acceleration and increasing acceleration, until the robot recovers to the initial running velocity $v_0$.

It shall be noted that the above-described decreasing acceleration is a process opposite from the increasing deceleration, and the increasing acceleration is a process opposite from the decreasing deceleration.

Further, it shall be noted that the above-described embodiment is only an example and does not limit the technical solutions and the scope to be protected of the present disclosure. In practical applications, an operation of controlling the robot to decelerate in accordance with the above-described types of velocity curves may be set reasonably by skilled persons in the art through technical means mastered by the skilled persons in the art.

Further, that the robot is controlled to decelerate in accordance with the above-described various velocity curves and that an accelerated velocity value required during a process of recovering a running speed may be reasonably set and are not limited herein.

Compared with the existing technology, in the localization manner provided in this embodiment, after it is determined that the localization succeeds, by controlling the robot to accelerate to the first running velocity, i.e., to recover from the current running velocity to the initial running velocity, the robot may try to complete a task within a preset time period.

A third embodiment of this disclosure relates to a localization apparatus which is mainly applied to a robot with the autonomous localization and navigation function. A specific structure of the localization apparatus is shown in FIG. 9.

Figure 9:
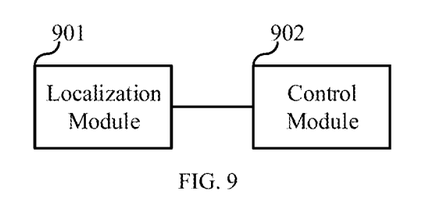
FIG. 9 is a block diagram of a localization device in a third embodiment of the present disclosure.

As shown in FIG. 9, the localization apparatus includes a localization module 901 and a control module 902.

Herein, the localization module 901 is configured to perform localization through an image of surrounding environment in a process of driving to a preset distance.

The control module 902 is configured to control the robot to decelerate after the localization module 901 determines that the localization through the image of surrounding environment fails, and control the localization module 901 to perform localization through an image of surrounding environment in a process of deceleration until the localization succeeds.

Particularly, in this embodiment, in a process that the robot installed with the localization apparatus drives to the preset distance, the localization module 901 may implement a localization operation through an image of surrounding environment in the following manner: the image of surrounding environment is compared with an image in a pre-generated map sample set; it is determined that the localization fails if the image of surrounding environment does not match any image in the map sample set; it is determined that the localization succeeds if the image of surrounding environment matches any image in the map sample set.

Further, it shall be noted that in this embodiment, the image of surrounding environment to match an image in the pre-generated map sample set is collected and acquired by using the image collecting apparatus at a preset cycle, such as once every 5 seconds.

It shall be noted that the above-described embodiment is only an example and does not limit the technical solutions and the scope to be protected of the present disclosure. In practical applications, a cycle that the image collecting apparatus collects an image of surrounding environment may be reasonably set in accordance with factors such as an environment that the robot locates and transmission performance of the robot, which are not limited herein.

Further, a position set for the image collecting device for collecting an image of surrounding environment is not limited. That is, the image collecting apparatus may be set on a robot (for a robot working directly on a road surface), or may be set on another object (for a robot working on a moving object). A specific implementation manner may be reasonably set by skilled persons in the art according to a practical requirement, which is not limited herein.

Further, for technical details that are not described in detail in this embodiment, the localization method provided in any embodiment in the present disclosure may be referred to, and details are not described herein for the purpose of clarity.

It is easy to discover through the above-described embodiment that the localization apparatus provided in this embodiment takes the advantage of cooperation between the localization module and the control module to enable the robot installed with the localization apparatus to reasonably adjust its running velocity in accordance with an environment it locates during a process of driving, thereby accurately localizing the location where the robot is located, and thereby timely and accurately planning for a navigation route to complete a task.

The above-described apparatus embodiment is only an example, but does not limit the protection scope of the present disclosure. In practical applications, skilled persons in the art may realize the objective of the solution of the present embodiment through some or all modules in accordance with practical needs, which is not limited herein.

Figure 10:
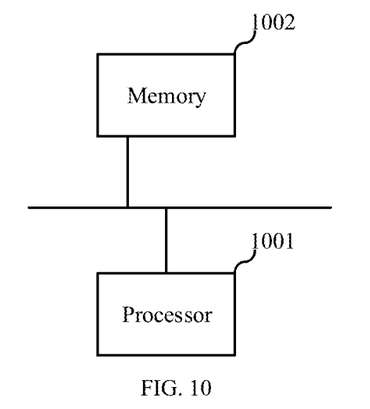
FIG. 10 is a block diagram of a robot in a fourth embodiment of the present disclosure.

A fourth embodiment of the present disclosure relates to a robot with a structure as shown in FIG. 10.

The robot may be a device such as an intelligent sweeping robot, a navigation robot, a drone, an autonomous vehicle with the autonomous localization and navigation function. The robot specifically includes one or more processors 1001 and a memory 1002. A processor 1001 is taken as an example in FIG. 10.

In this embodiment, every functional module in the localization apparatus involved in the above-described embodiment is installed in a processor 1001. The processor 1001 and the memory 1002 may be connected through a bus or in another manner. Connecting through a bus is taken as an example in FIG. 10.

As a computer readable storage medium, the memory 1002 may be configured to store a software program, a computer executable program and module such as a program instruction/module equivalent to the localization method involved in any method embodiment in the present disclosure. The processor 1001 executes various functional applications of a server and data processing by running the software program, instruction and module stored in the memory 1002, i.e., to realize the localization method in any method embodiment in the present disclosure.

The memory 1002 may include a program memory region and a data storage region. Herein the program memory region may store an operation system and an application program needed for at least one function. In the data storage region, a history database may be established to store the map sample set. Further, the memory 1002 may include a high-speed random access memory, and may include a random access memory (RAM) and the like. In some embodiments, the memory 1002 may optionally include a memory set remotely from the processor 1001. The remote memory may connect to a terminal device through network. The above-described network embodiment includes but is not limited to the Internet, an intranet, a local network, mobile communication network and a combination thereof.

In practical applications, the memory 1002 may store an instruction executed by at least one processor 1001. The instruction is executed by at least one processor 1001, so that the at least one processor 1001 may execute the localization method involved in any method embodiment of the present disclosure and control each functional module in the localization apparatus to complete the localization operation in the localization method. As to technical details not described specifically in this embodiment, the localization method provided in any embodiment of the present disclosure may be referred to.

Further, it shall be noted that as the cloud computing technology develops, in order to further improve a processing capability of the robot, the robot in this embodiment may be a cloud intelligent robot, that is, a "brain" of the robot to perform processing operation is located in a cloud.

Specifically, the cloud intelligent robot connects a robot body and the cloud "brain" with a safe and fast mobile network, making intelligent computing capability in the cloud a convenient service, thereby greatly reducing research and development costs of operation of the intelligent robot. Besides, with powerful computing capability of the cloud, it is more convenient and faster to perform autonomous navigation and achieve rapid localization.

It shall be noted that the above-mentioned two types of robots are only specific examples in the embodiment, but do not limit the technical solutions and the scope to be protected of the present disclosure. In practical applications, skilled persons in the art may implement a robot based on an implementation process of the above-described localization method on the basis of the current development of machinery devices, which is not limited herein.

A fifth embodiment of the present disclosure relates to a computer readable storage medium storing a computer instruction to cause a computer to execute the localization method involved in any method embodiment of the present disclosure.

Skilled persons in the art may understand that the above-described embodiments are specific embodiments for implementing the present disclosure, and various changes can be made in the form and details to the embodiments without departing from the spirit and scope of the disclosure.

What is claimed is:

1. A localization method, applied to a robot with an autonomous localization and navigation function, the localization method comprising:
    determining that localization through an image of surrounding environment fails in a process of driving to a preset distance;
    controlling the robot to decelerate and perform localization through an image of surrounding environment in a process of deceleration until the localization succeeds;
    wherein the controlling the robot to decelerate and perform localization through the image of surrounding environment in the process of deceleration comprises:
        controlling the robot to decelerate from a first running velocity to a second running velocity;
        re-acquiring an image of surrounding environment to perform localization after the robot decelerates to the second running velocity;
        stopping deceleration when it is determined that the localization succeeds;
        controlling the robot to further decelerate when it is determined that the localization fails, and to re-acquire an image of surrounding environment to perform localization until the localization succeeds.

2. The localization method according to claim 1, wherein the determining that localization through the image of surrounding environment fails comprises:
    acquiring the image of surrounding environment at a preset cycle;
    comparing the image of surrounding environment with an image in a pre-generated map sample set; and
    determining that the localization fails when the image of surrounding environment does not match any image in the map sample set.

3. The localization method according to claim 1, wherein after it is determined that the localization succeeds, the localization method further comprises:
    acquiring a current running velocity;
    controlling the robot to accelerate to the first running velocity when the acquired current running velocity is greater than or equal to 0.

4. The localization method according to claim 1, wherein the controlling the robot to decelerate comprises:
    controlling the robot to decelerate in accordance with a velocity curve;
    wherein the velocity curve denotes a correspondence between a running velocity and time.

5. The localization method according to claim 4, wherein the velocity curve may be any one of or any combination of the following: a cosine velocity curve, a sinusoidal velocity curve, a trapezoidal velocity curve and an S-shaped velocity curve.

6. The localization method according to claim 5 wherein an angle denoted in a cosine value in the cosine velocity curve has a value range of $[0, \pi]$.

7. The localization method according to claim 5, wherein an angle denoted in a sinusoidal value in the sinusoidal velocity curve has a value range of $[\pi, 2\pi]$.

8. A robot, comprising:
    at least one processor; and
    a memory in communication connection with the at least one processor; wherein,
    the memory stores an instruction executable by the at least one processor, when the instruction is executed by the at least one processor, the at least one processor is caused to execute a localization method applied to a robot with an autonomous localization and navigation function, the localization method comprising:
    determining that localization through an image of surrounding environment fails in a process of driving to a preset distance;
    controlling the robot to decelerate and perform localization through an image of surrounding environment in a process of deceleration until the localization succeeds;
    wherein the controlling the robot to decelerate and perform localization through the image of surrounding environment in the process of deceleration comprises:
        controlling the robot to decelerate from a first running velocity to a second running velocity;
        re-acquiring an image of surrounding environment to perform localization after the robot decelerates to the second running velocity,
        stopping deceleration when it is determined that the localization succeeds;
        controlling the robot to further decelerate when it is determined that the localization fails, and to re-acquire an image of surrounding environment to perform localization until the localization succeeds.

9. The robot according to claim 8, wherein the determining that localization through the image of surrounding environment fails comprises:
    acquiring the image of surrounding environment at a preset cycle;
    comparing the image of surrounding environment with an image in a pre-generated map sample set; and
    determining that the localization fails when the image of surrounding environment does not match any image in the map sample set.

10. The robot according to claim 8, wherein after it is determined that the localization succeeds, the localization method further comprises:
    acquiring a current running velocity;
    controlling the robot to accelerate to the first running velocity when the acquired current running velocity is greater than or equal to 0.

11. The robot according to claim 8, wherein the controlling the robot to decelerate comprises:
    controlling the robot to decelerate in accordance with a velocity curve;
    wherein the velocity curve denotes a correspondence between a running velocity and time.

12. The robot according to claim 11, wherein the velocity curve may be any one of or any combination of the following: a cosine velocity curve, a sinusoidal velocity curve, a trapezoidal velocity curve and an S-shaped velocity curve.

13. The robot according to claim 12, wherein an angle denoted in a cosine value in the cosine velocity curve has a value range of $[0, \pi]$.

14. The robot according to claim 12, wherein an angle denoted in a sinusoidal value in the sinusoidal velocity curve has a value range of $[\pi, 2\pi]$.

15. A non-transitory computer readable storage medium, storing a computer instruction causing a computer to execute a localization method applied to a robot with an autonomous localization and navigation function, the localization method comprising:
    determining that localization through an image of surrounding environment fails in a process of driving to a preset distance;

controlling the robot to decelerate and perform localization through the image of surrounding environment in a process of deceleration until the localization succeeds;

wherein the controlling the robot to decelerate and perform localization through the image of surrounding environment in the process of deceleration comprises;

controlling the robot to decelerate from a first running velocity to a second running velocity;

re-acquiring an image of surrounding environment to perform localization after the robot decelerates to the second running velocity;

stopping deceleration when it is determined that the localization succeeds;

controlling the robot to further decelerate when it is determined that the localization fails and to re-acquire an image of surround environment to perform localization until the localization succeeds.

16. The non-transitory computer readable storage medium according to claim 15, wherein the determining that localization through the image of surrounding environment fails comprises:

acquiring the image of surrounding environment at a preset cycle;

comparing the image of surrounding environment with an image in a pregenerated map sample set; and determining that the localization fails when the image of surrounding environment does not match any image in the map sample set.

\* \* \* \* \*